United States Patent
Lee et al.

(10) Patent No.: US 9,749,352 B2
(45) Date of Patent: *Aug. 29, 2017

(54) APPARATUS AND METHOD FOR COLLECTING HARMFUL WEBSITE INFORMATION

(71) Applicant: Foundation of Soongsil University-Industry Cooperation, Seoul (KR)

(72) Inventors: Sangjun Lee, Seongnam-si (KR); Junghoon Shin, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 35 days.

This patent is subject to a terminal disclaimer.

(21) Appl. No.: 14/654,675

(22) PCT Filed: Nov. 12, 2013

(86) PCT No.: PCT/KR2013/010216
§ 371 (c)(1),
(2) Date: Jun. 22, 2015

(87) PCT Pub. No.: WO2014/098372
PCT Pub. Date: Jun. 26, 2014

(65) Prior Publication Data
US 2015/0341381 A1  Nov. 26, 2015

(30) Foreign Application Priority Data

Dec. 20, 2012 (KR) .................. 10-2012-0149671
Nov. 12, 2013 (KR) .................. 10-2013-0136638

(51) Int. Cl.
*H04L 29/06* (2006.01)
*H04L 29/08* (2006.01)
(Continued)

(52) U.S. Cl.
CPC .......... *H04L 63/1441* (2013.01); *G06F 21/50* (2013.01); *G06F 21/51* (2013.01);
(Continued)

(58) Field of Classification Search
CPC . G06F 21/56; H04L 63/1441; H04L 63/1483; H04L 63/168
See application file for complete search history.

(56) References Cited

U.S. PATENT DOCUMENTS 6,996,845 B1   2/2006 Hurst et al.
7,698,442 B1   4/2010 Krishnamurthy et al.
(Continued)

FOREIGN PATENT DOCUMENTS

JP   2009037420 A   2/2009
KR   2001-0103131 A   11/2001
(Continued)

OTHER PUBLICATIONS

Gyongyi et al., "Combating Web Spam with TrustRank", 2004, pp. 576-587.*
(Continued)

*Primary Examiner* — Thaddeus Plecha
(74) *Attorney, Agent, or Firm* — Novick, Kim & Lee, PLLC; Sang Ho Lee (57) ABSTRACT

Provided are a harmful site collection device and method for determining a harmful site by analyzing a connection between harmful sites. The harmful site collection device extracts a URL linked to a web page of a harmful site; checks a link circulation on the basis of link information on a web page of the URL linked to the harmful site to determine whether the web page of the URL linked to the harmful site is a harmful site; and, when a URL of a prestored non-harmful site is extracted while the link circulation is checked, stops checking the link circulation that
(Continued)

(a) (b) (c)

CONFIRMED HARMFUL SITE 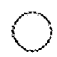 PROVISIONAL HARMFUL SITE includes the URL of the non-harmful site. Accordingly, the harmful site collection device can more easily determine a harmful site merely with information on a URL linked to a web page and can reduce the amount of computation using information on a URL of a prestored non-harmful site.

7 Claims, 6 Drawing Sheets (51) Int. Cl.
G06F 21/50 (2013.01)
G06F 21/60 (2013.01)
G06F 21/51 (2013.01)
G06F 21/56 (2013.01)
G06F 21/57 (2013.01)

(52) U.S. Cl.
CPC .......... G06F 21/566 (2013.01); G06F 21/577 (2013.01); G06F 21/60 (2013.01); H04L 63/14 (2013.01); H04L 63/1483 (2013.01); H04L 63/168 (2013.01); H04L 67/02 (2013.01); G06F 2221/034 (2013.01); G06F 2221/2119 (2013.01); H04L 63/1408 (2013.01)

(56) References Cited

U.S. PATENT DOCUMENTS

| 8,429,750 | B2* | 4/2013 | Bennett | G06F 17/30864 |
| | | | | 707/726 |
| 9,356,941 | B1* | 5/2016 | Kislyuk | H04L 63/14 |
| 2001/0037385 | A1 | 11/2001 | Kim | |
| 2006/0041508 | A1 | 2/2006 | Pham et al. | |
| 2006/0041540 | A1* | 2/2006 | Shannon | G06F 17/30882 |
| 2007/0005652 | A1 | 1/2007 | Choi et al. | |
| 2008/0086555 | A1* | 4/2008 | Feinleib | G06F 17/30705 |
| | | | | 709/224 |
| 2008/0208858 | A1 | 8/2008 | Kim et al. | |
| 2009/0178116 | A1 | 7/2009 | Nagoya et al. | |
| 2009/0198673 | A1* | 8/2009 | Gao | G06F 17/30864 |
| 2010/0262693 | A1* | 10/2010 | Stokes | H04L 63/1408 |
| | | | | 709/225 |
| 2012/0023566 | A1* | 1/2012 | Waterson | G06F 21/56 |
| | | | | 726/9 |
| 2012/0096553 | A1* | 4/2012 | Srivastava | G06F 21/56 |
| | | | | 726/24 |

FOREIGN PATENT DOCUMENTS

| KR | 2007-0003495 A | 1/2007 |
| KR | 10-0848319 B1 | 7/2008 |
| KR | 2009-0075524 A | 7/2009 |

OTHER PUBLICATIONS

Young-Hun Jang, "Automatic Harmful Website Rating System Based on Hyperlink Relationship" (May 2005).

Ahmed Belderrar et al, "Sub-graph Mining: Identifying Micro-architectures in Evolving Object-oriented Software", Software Maintenance and Reengineering (CSMR), 2011 15th European Conference on, IEEE, Mar. 1, 2011, pp. 171-180.

Janak J. Parekh et al., "Privacy-Preserving Payload-Based Correlation for Accurate Malicious Traffic Detection", Department of Computer Science, Columbia University, Sep. 15, 2006.

* cited by examiner

APPARATUS AND METHOD FOR COLLECTING HARMFUL WEBSITE INFORMATION

TECHNICAL FIELD

The present invention relates to a harmful site collection device and method in which a harmful site is automatically determined and added to a list.

BACKGROUND ART

The wide use of a global network such as the Internet that links devices worldwide has brought rapid changes in modern people's daily life. The old era is gone in which people strive for information, and a new era has come in which it is important how useful information is selected from an overflowing abundance of information stored in information database that is easily accessible via the Internet. Actually, the sharing of information through the Internet has contributed amazingly to the technical development by and knowledge sharing between modern people. However, easy accessibility and rapid information diffusion also involve many side effects.

Examples of the side effects caused by the Internet may include the leakage and easy accessibility of personal information due to poor security and the flood of pornographic materials commercially available on the Internet. Actually, it is statistically known that the most commercially successful business among Internet businesses is a pornographic material business, and thus the distribution of the pornographic materials through the Internet causes a big social issue.

People from children to adults who can use their personal computer without any difficulty are randomly exposed to harmful sites. Thus, hardware devices and software programs are being developed to prevent computer terminals from accessing such harmful sites at home or in office.

A harmful site blocking technique is largely divided into two: a method of analyzing contents of a website in real time to determine whether the website is harmful or not; and a method of using a harmful site database to block access to the harmful sites. Most harmful site blocking techniques used in the present employ the method of using a harmful site database to block access to the harmful sites. This method is more convenient and effective than the real-time analysis method.

However, new harmful sites are constantly appearing, and contents and addresses of the websites are frequently changed. Thus, it is difficult and also takes too much time for people to manually maintain the harmful site database in the latest version.

DISCLOSURE

Technical Problem

The present invention is directed to providing a harmful site collection device and method, which analyze a connection between harmful sites and automatically determine a harmful site.

The present invention is also directed to providing a harmful site collection device and method, which, when a URL collected to determine a harmful site is the same as a prestored URL of a non-harmful site, removes the URL from the determination in advance such that the URL may not be used to check a connection between harmful sites.

Technical Solution

One aspect of the present invention provides a harmful site collection device including: a database configured to store a harmful site URL and a non-harmful site URL; a web page collection and extraction unit configured to collect web page information using, as a start point, a URL linked to a harmful site web page indicated by the harmful site URL and extract link information included in the web page information; a URL processing unit configured to normalize a URL included in the link information to create a representative URL, remove the representative URL when the representative URL is the same as the non-harmful site URL, and store, as a provisional harmful site URL in the database, a representative URL that is not the same as the harmful site URL among representative URLs in which the non-harmful site URL is removed therefrom; and a harmful site connection analysis unit configured to check a link circulation using the provisional harmful site URL as a start point and determine whether a web page of the provisional harmful site URL is a harmful site according to the link circulation.

The URL processing unit may divide a URL included in the link information extracted by the web page collection and extraction unit into a sub-page URL and an other-page URL and extracts a representative URL in which a sub-directory of the other-page URL is removed therefrom.

The database may store a URL of a confirmed harmful site and a URL of a provisional harmful site.

The harmful site connection analysis unit determining whether a web page of the provisional harmful site URL is a harmful site according to the link circulation may include calculating a directed graph showing a link circulation using a URL linked to the harmful site web page as a start point and confirming the URL as a harmful site when a URL of at least one web page among web pages included in the directed graph is the same as the harmful site URL prestored in the database.

The database may store statistical analysis information regarding words included in the harmful site URL.

The harmful site collection device may further include a harmful site rank calculation unit configured to calculate a harmful site rank of the web page of the URL linked to the harmful site web page when the web page of the URL linked to the harmful site web page is checked not to be a harmful site according to the link circulation.

The harmful site rank calculation unit calculating a harmful site rank of the web page of the URL linked to the harmful site web page may include checking whether the URL linked to the harmful site web page includes a word included in the harmful site ULR stored in the database and calculating a harmful site rank according to statistical analysis information regarding the word when the word is included.

Another aspect of the present invention provides a method of collecting a harmful site, the method including: extracting a URL linked to a harmful site web page; checking a link circulation using a web page of a URL linked to the harmful site web page and determining whether the web page of the URL linked to the harmful site web page is a harmful site according to the link circulation; and when a prestored non-harmful site URL is extracted while the link circulation is checked, stopping checking the link circulation including the non-harmful site URL.

The determining of whether the web page of the URL linked to the harmful site web page is a harmful site according to the link circulation may include calculating a directed graph including at least one web page linked to the web page of the URL linked to the harmful site web page to check a connection therebetween and confirming the web page of the URL linked to the harmful site web page as a harmful site when a predetermined confirmed harmful site is included in the directed graph.

The method may further include calculating a harmful site rank of the web page of the URL linked to the harmful site web page when the web page of the URL linked to the harmful site web page is checked not to be a harmful site according to the link circulation, in which the calculating of the harmful site rank may include calculating the harmful site rank according to whether the URL linked to the harmful site web page includes a word included in the harmful site URL and statistical analysis information regarding the word.

Advantageous Effects

As described above, according to one aspect of the present invention, the harmful site collection device can determine a harmful site more easily using a connection of a URL linked to a web page.

According to another aspect of the present invention, the harmful site collection device can remove a non-harmful site list when determining a link circulation connected to determine a harmful site, thus reducing the amount of computation.

MODES OF THE INVENTION

Hereinafter, exemplary embodiments of the present invention will be described in detail with reference to the accompanying drawings. In adding reference numbers for elements in each figure, it should be noted that like reference numbers already used to denote like elements in other figures are used for elements wherever possible.

Figure 1:
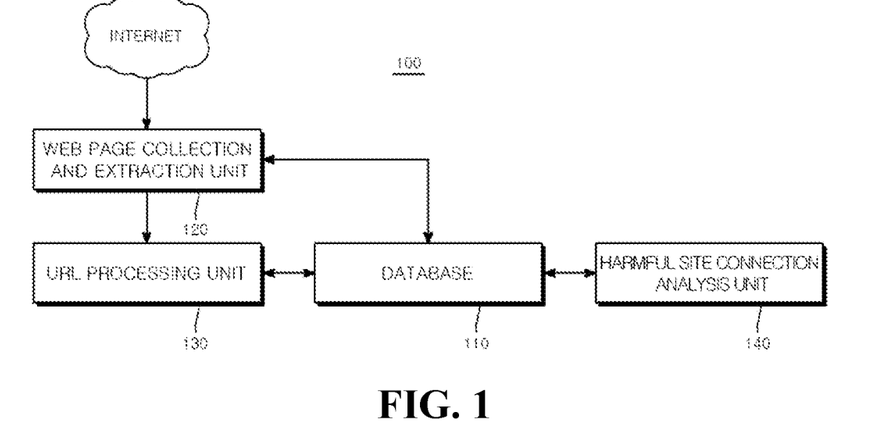
FIG. 1 is a block diagram showing a harmful site collection device according to an embodiment of the present invention.
Figure 2:
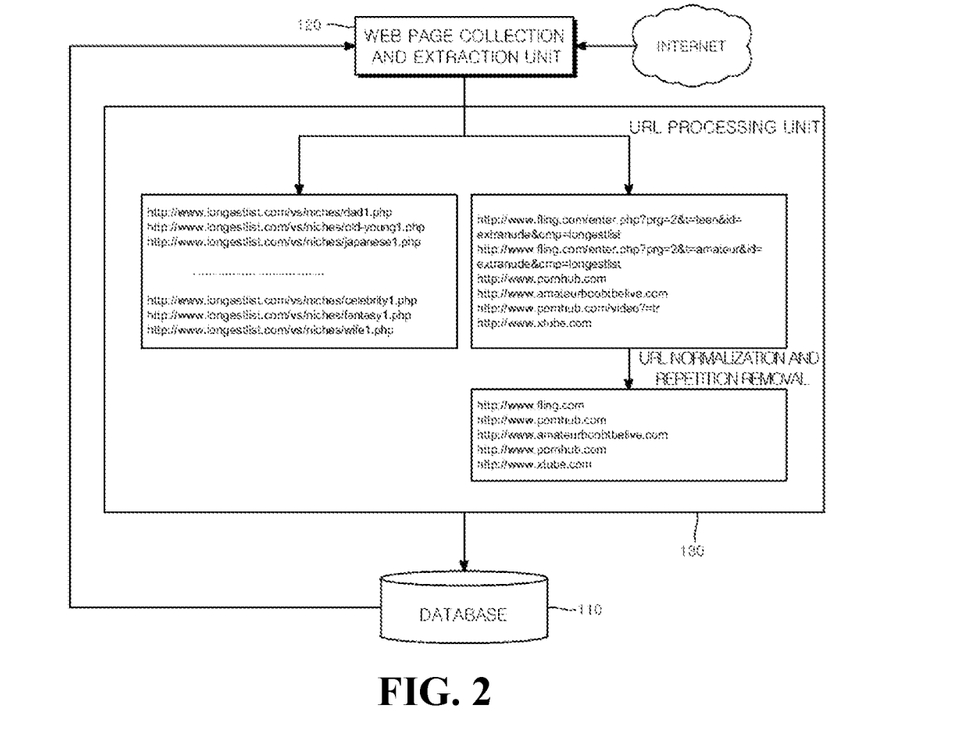
FIG. 2 is a conceptual diagram for describing an operation of a URL processing unit of FIG. 1.
Figure 3:
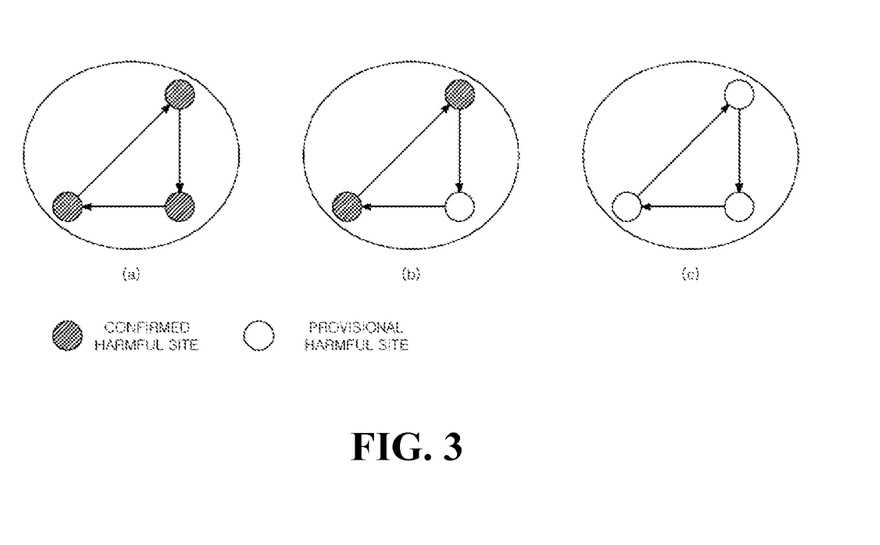
FIG. 3 is a diagram for describing directed graphs that are calculated by a harmful site connection analysis unit of FIG. 1.

FIG. 1 is a block diagram showing a harmful site collection device according to an embodiment of the present invention, FIG. 2 is a conceptual diagram for describing an operation of a URL processing unit of FIG. 1, and FIG. 3 is a diagram for describing directed graphs that are calculated by a harmful site connection analysis unit of FIG. 1.

A harmful site collection device 100 may include a database 110, a webpage collection and extraction unit 120, a URL processing unit 130, and a harmful site connection analysis unit 140.

The database 110 may store a harmful site list. The harmful site list may be a list in which information on uniform resource locators (URLs) of harmful sites is arranged. The database 110 may store a list of URL information of confirmed harmful sites and a list of URL information of provisional harmful sites.

The database 110 may store a non-harmful site list. The non-harmful site list may be a list in which URL information of non-harmful sites is arranged.

The database 110 may store statistical analysis information regarding words included in a URL classified as a harmful site. The statistical analysis information regarding words may include information on the probability that a site including the words belongs to a harmful site. The information on the probability of belonging to the harmful site may be entered to the database 110 by a designer or automatically calculated and then stored. For the former, the designer manually enters, to the database 110, information provided by analyzing the URL classified as a harmful site. For the latter, the URL processing unit 130 parses a prestored URL of a harmful site to extract words, calculates statistical analysis information using the number of extracted words, and stores the calculated information in the database 110. In this case, as the number of overlaps between words extracted from URLs of a plurality of harmful sites increases, statistical analysis information indicating that the probability of belonging to the harmful site increases may be calculated and then stored. On the contrary, as the number of overlaps between words decreases, statistical analysis information indicating that the probability of belonging to the harmful site decreases may be calculated and then stored.

The web page collection and extraction unit 120 may collect information on a corresponding web page and extract link information included in the web page information in a web crawling technique.

The web page collection and extraction unit 120 may receive a URL of a confirmed harmful site from the database 110 and download a corresponding web page from the Internet. The web page collection and extraction unit 120 may parse the downloaded web page to extract information on all links. Here, the link information may include URL information or IP information, and the URL information may be defined as a hyper text markup language (HTML) tag as Equation 1 below:

$$a\ href="http://www.host.com/dirctory/file.html">Link</a>. \quad \text{Equation 1}$$

The URL processing unit 130 may divide the URL information included in the link information into a sub-page URL information and other-page URL information. The URL processing unit 130 may compare the extracted sub-page URL information and other-page URL information with harmful site URL information and non-harmful site URL information that are prestored in the database 110 to extract only new URL information. The URL processing unit 130 may add the extracted new URL information to a provisional harmful site list of the database 110.

Referring to FIG. 2, the web page collection and extraction unit 120 may receive a URL of a confirmed harmful site from the database 110 and download a web page corresponding to the URL. The web page collection and extraction unit 120 may parse the web page to extract link information in a web crawling technique. The URL processing unit 130 may divide URL information included in the link information into sub-page URL information and other-page URL information. The URL processing unit 130 may compare the sub-page URL information with harmful site URL information stored in the database 110, determine whether the sub-page is visited, extract only URL information on sub-pages that have never been visited, and stores the extracted sub-page URL information in the database 110. The URL processing unit 130 may normalize the other-page URL information and extract representative URL information. Here, the normalization of the other-page URL information denotes a series of process of removing a subdirectory from among the URL information, extracting URL information only having "protocol information" and "position information regarding a computer having information resources," and removing repeated URL information from among the extracted URL information. For example, the normalization denotes a series of process of extracting URL information (3) obtained by removing a subdirectory from URL information (1) or URL information (2).

1) http://www.fling.com/enter.php?prg=2&t=teen&id 2) http://www.fling.com/
    enter.php?prg=2&t=amateur&id 3) http://www.fling.com/The           Equation 2

URL processing unit 130 may compare the representative URL information obtained by normalizing the other-page URL information with the non-harmful site URL information prestored in the database 110 and perform classification such that a representative URL that is the same as the non-harmful site URL may not be stored in the database 110 as a provisional harmful site URL. Through this process, web pages linked to non-harmful sites are not collected, and thus entire work efficiency can be enhanced.

The URL processing unit 130 may compare the representative URL information (representative URL information in which a URL that is the same as the non-harmful site URL is removed therefrom) obtained by normalizing the other-page URL information with the harmful site URL information stored in the database 110 and add representative URL information that is different from the harmful site URL information to a provisional harmful site list of the database 110.

The harmful site connection analysis unit 140 may create a directed graph indicating link circulation information of a provisional harmful site and confirm the provisional harmful site as a harmful site. The directed graph denotes a graph in which any provisional harmful site is designated as a start point, another site referenced by the provisional harmful site is designated as a first intermediate point, another site referenced by the site of the first intermediate point is designated as a second intermediate point, and a circulation is found in the same manner and ultimately returned to the provisional harmful site corresponding to the start point.

When the link information extracted by the web page collection and extraction unit 120 parsing the web page of the provisional harmful site is temporarily stored in the database 110, the harmful site connection analysis unit 140 may use the link information to analyze another web page connected thereto.

When a non-harmful site prestored in the database 110 is extracted while a connection with a linked web page is analyzed in order to calculate a directed graph, the harmful site connection analysis unit 140 stops analyzing a connection of a corresponding line. For example, assuming that site B is linked to site A, site C is linked to site B, and site C is a prestored non-harmful site, the harmful site connection analysis unit 140 stop analyzing a connection of a corresponding line. In this case, the amount of data used to analyze a connection between harmful sites may be reduced in proportion to the number of prestored non-harmful sites.

Referring to FIG. 3, in case of (a), a directed graph indicating a circulation of confirmed harmful sites is shown. This reflects that there is a high possibility that the harmful sites will reference one another. In case of (b), a circulation is formed by the confirmed harmful sites and the provisional harmful site, and in this case, the provisional harmful site may be confirmed as a harmful site. In case of (c), a circulation is not formed by the confirmed harmful sites and the provisional harmful sites, and thus the provisional harmful sites are not confirmed as harmful sites. However, even in case of (c), there may be a harmful site. Thus, in an embodiment to be described below, ranks of the provisional harmful sites are calculated and provided to a user.

Meanwhile, the directed graphs in FIG. 3 have three vertices. However, it will be appreciated that the graphs may have the form of a straight line connecting two vertices or a polygon having four or more vertices. In addition, it will be appreciated that the directed graph may be an acyclic graph in which a circulation is not formed. In this case, the provisional harmful site included in the acyclic graph is not confirmed as the harmful site and subsequently is subject to calculation of the harmful site rank.

Figure 4:
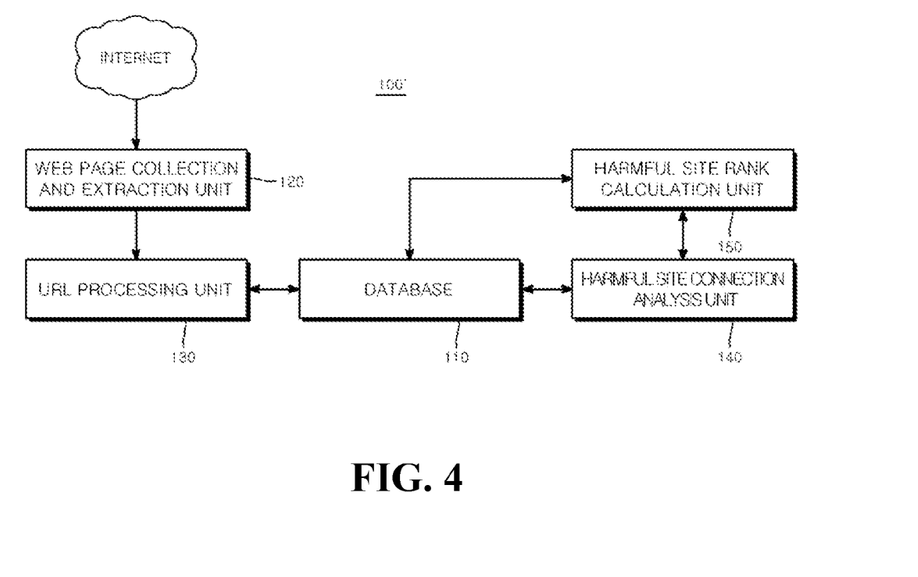
FIG. 4 is a block diagram showing a harmful site collection device according to another embodiment of the present invention.
Figure 5:
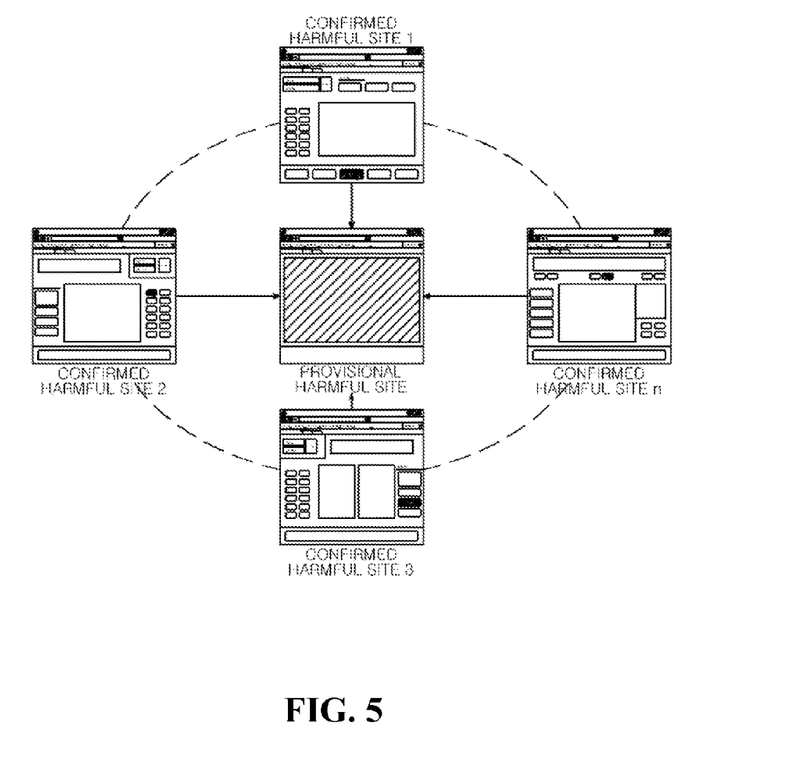
FIG. 5 is a conceptual view for describing a principle in which a rank is calculated by a harmful site rank calculation unit of FIG. 4.

FIG. 4 is a block diagram showing a harmful site collection device according to another embodiment of the present invention, and FIG. 5 is a conceptual view for describing a principle in which a rank is calculated by a harmful site rank calculation unit of FIG. 4.

Compared to an embodiment of FIG. 1, an embodiment of FIG. 4 is characterized in that a harmful site rank calculation unit 150 is additionally included. Accordingly, the description of the same components as those of FIG. 1 is not repeated.

The harmful site rank calculation unit 150 may calculate harmful site ranks of the provisional harmful sites that are not confirmed as a harmful site by the harmful site connection analysis unit 140. This is performed because there may be a harmful site even when the harmful site connection analysis unit 140 creates an acyclic directed graph and thus the provisional harmful sites are not confirmed as the harmful site.

In order to calculate a rank of a provisional harmful site that is not confirmed as a harmful site, the harmful site rank calculation unit 150 may utilize statistical analysis information regarding words included in the harmful site prestored in the database 110 or the number of overlaps between a word included in the URL of the site and a word included in the harmful site that is prestored in the database 110.

Specifically, the harmful site rank calculation unit 150 parses a word included in a URL of a provisional harmful site that is not confirmed as a harmful site and checks whether the parsed word is the same as a word included in the harmful site prestored in the database 110. When the word included in the URL of the provisional harmful site is the same as the word included in the harmful site, the harmful site rank calculation unit 150 may check information on probability of belonging to the harmful site of the word and set the rank according to the probability information. That is, on a condition that the word included in the URL is the same as the word included in the harmful site prestored in the database 110, the rank is set to be high when the word has a high probability of belonging to the harmful site, and the rank is set to be low when the word has a low probability of belonging to the harmful site. That is, the harmful site rank calculation unit 150 may set the rank to be high when the word included in the URL of the provisional harmful site that is not confirmed as the harmful site is a word repeated many times in the URL of the harmful site and set the rank to be low when the word in the URL of the provisional harmful site is a word repeated a few times.

In addition, the harmful site rank calculation unit 150 may set the rank to be high when the URL of the provisional harmful site that is not confirmed as the harmful site includes many words included in the harmful site that is prestored in the database 110 and set the rank to be low when the URL of the provisional harmful site includes a few words.

The harmful site rank calculation unit 150 may calculate a rank in consideration of whether a word included in the URL of the provisional harmful site that is not confirmed as a harmful site is the same as a word included in the harmful site prestored in the database 110 and the number of the same words. First, the harmful site rank calculation unit 150 may calculate the rank according to the number of words of a harmful site URL prestored in the database 110, which are also included in the URL of the provisional harmful site, and calculate ranks of URLs including the same number of harmful site URL words using probability information on the harmful site URL words.

Figure 6:
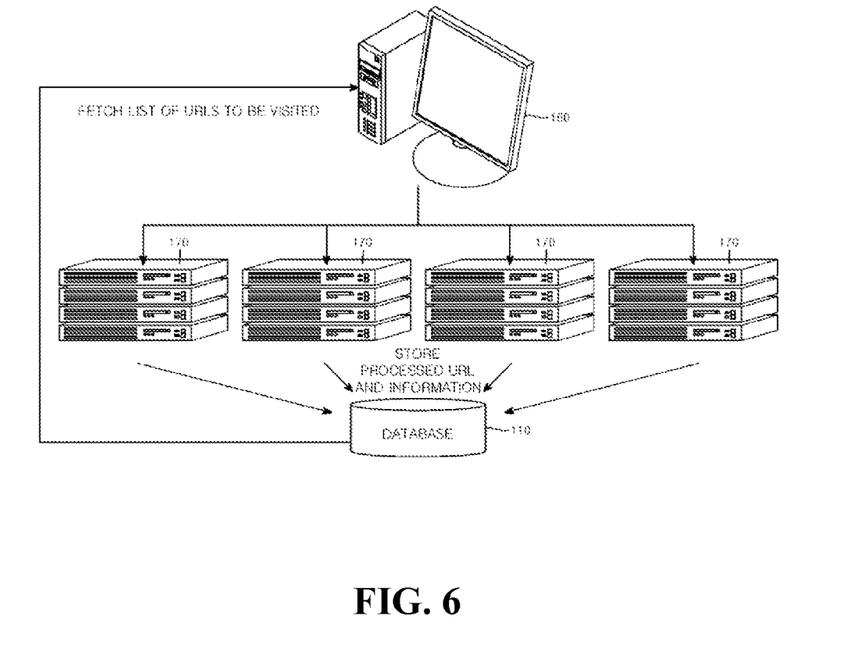
FIG. 6 is a diagram for describing a distributed processing method of the harmful site collection device according to an embodiment of the present invention.

FIG. 6 is a diagram for describing a distributed processing method of the harmful site collection device according to an embodiment of the present invention.

The harmful site collection device 100 may be configured to include a distributed processing master device 160 and distributed processing slave devices 170, which may shorten the time needed to collect and process information by the web page collection and extraction unit 120, the URL processing unit 130, the harmful site connection analysis unit 140, and the harmful site rank calculation unit 150.

The distributed processing master device 160 may receive a list of URLs to be visited from the database 110 and assign the URL list to the distributed processing slave devices 170. Each distributed processing slave device 170 may collect and process web sites corresponding to the assigned URL list to update harmful sites or may calculate a rank of the provisional harmful site and store the calculated rank in the database 110.

It can be seen that a processing speed of the above-described method may increase in proportion to the number of distributed processing slave devices 170, compared to a method in which the distributed processing master device 160 operates independently.

Figure 7:
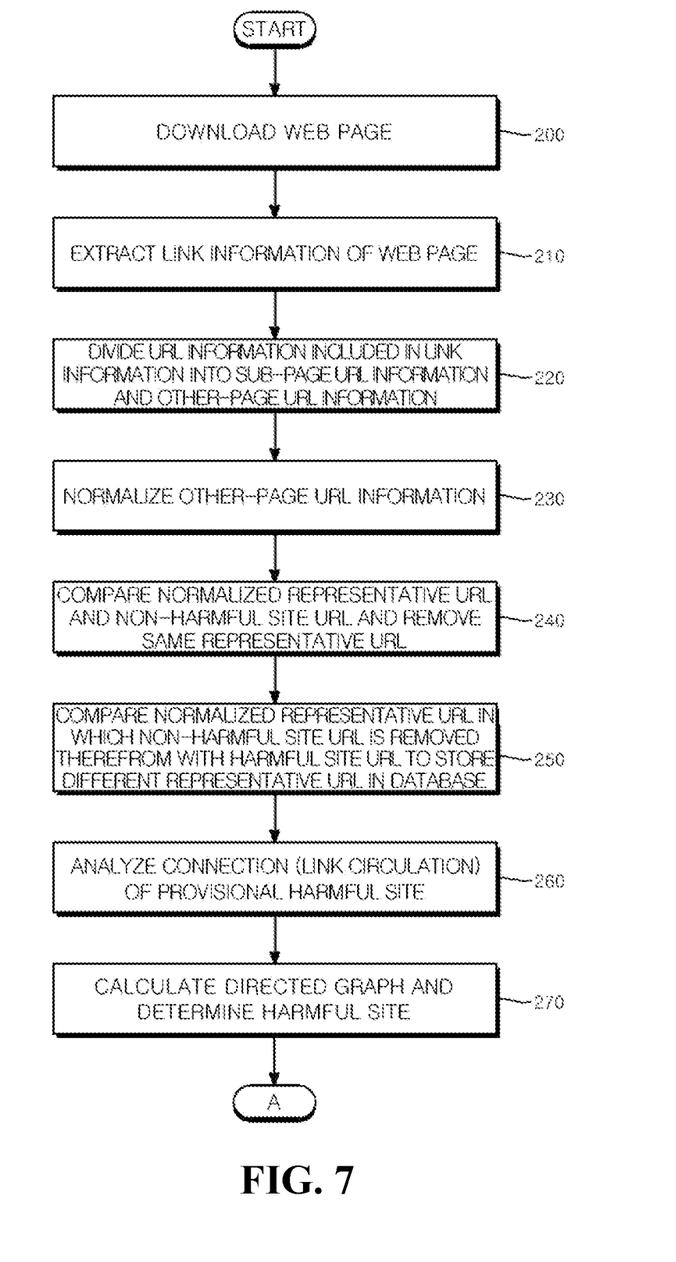
FIG. 7 is a control flowchart of the harmful site collection device according to an embodiment of the present invention.

FIG. 7 is a control flowchart of a harmful site collection device according to an embodiment of the present invention.

The webpage collection and extraction unit 120 receives information on URLs to be visited from the database 110 and downloads a web page corresponding to the received URL information (200).

The web page collection and extraction unit 120 extracts link information of the web page in a well-known web crawling technique (210).

The URL processing unit 130 may divide URL information included in the extracted link information into sub-page URL information and other-page URL information. The URL processing unit 130 may compare the extracted sub-page URL information and other-page URL information with URL information prestored in the database 110 to extract only new URL information (220).

The URL processing unit 130 normalizes the other-page URL information to extract representative URL information.

As described above, the normalization of the other-page URL information denotes a process of removing a subdirectory from among the URL information and extracting only top URL information (230).

The URL processing unit 130 may compare a normalized representative URL with a non-harmful site URL prestored in the database 110, and when the normalized representative URL is the same as the non-harmful site URL, classify and remove the URL such that the URL may not be stored as the provisional harmful site in the database 110 (240).

The URL processing unit 130 may compare the representative URL in which the non-harmful site URL is removed therefrom with the harmful site URL prestored in the database 110 and store the representative URL that is not the same as the harmful site URL in a provisional harmful site list (250).

The harmful site connection analysis unit 140 may create a directed graph indicating a link circulation of a provisional harmful site and determine whether the provisional harmful site is a harmful site. As described above, the harmful site connection analysis unit 140 may analyze a link of the provisional harmful site to confirm the provisional harmful site as a harmful site when the provisional harmful site forms a circulation with a harmful site and to determine the provisional harmful site not to be a harmful site when the directed graph is not closed or when the directed graph is closed but the provisional harmful site is not linked to a confirmed harmful site. In this case, when a site connected with the provisional harmful site is the prestored non-harmful site while a link circulation of the provisional harmful site is analyzed in order to calculate a directed graph, the harmful site connection analysis unit 140 may stop analyzing a directed graph of a corresponding line, thus increasing analysis efficiency (260, 270).

Figure 8:
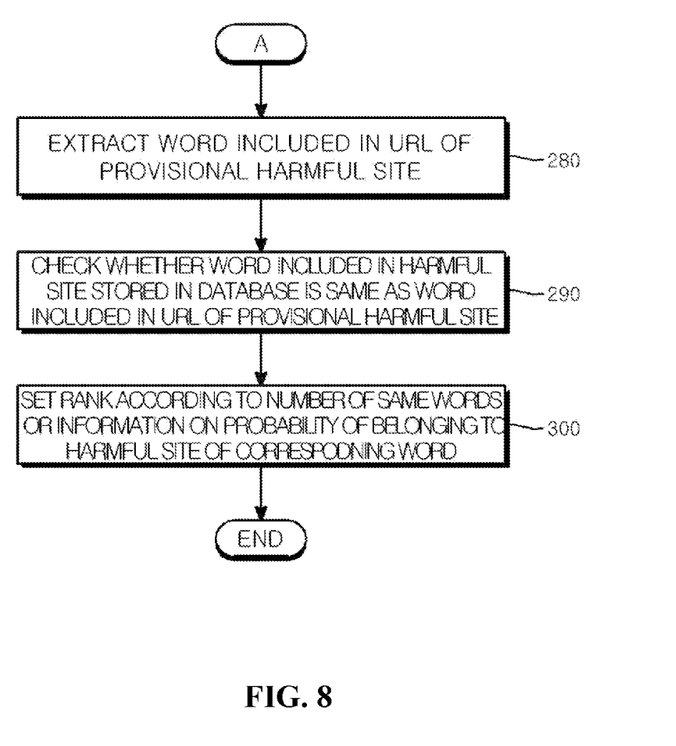
FIG. 8 is a control flowchart of the harmful site collection device according to another embodiment of the present invention.

FIG. 8 is a control flowchart of a harmful site collection device according to another embodiment of the present invention.

FIG. 8 is a flowchart for describing a method of calculating a rank of the provisional harmful site that is not yet confirmed as a harmful site after the control flow of FIG. 7 is completed.

The harmful site rank calculation unit 150 may classify provisional harmful sites that are not confirmed as a harmful site by the harmful site connection analysis unit 140. In order to calculate a rank of a provisional harmful site that is not confirmed as a harmful site, the harmful site rank calculation unit 150 may use statistical analysis information regarding words included in the harmful site prestored in the database 110.

The harmful site rank calculation unit 150 parses the URL of the provisional harmful site to extract a word (280).

When the word included in the URL of the provisional harmful site is the same as the word included in the harmful site, the harmful site rank calculation unit 150 may check information on probability of belonging to the harmful site of the word and the number of the same words and may set the rank according to the probability information (290, 300).

Although the present invention has been described with reference to exemplary embodiments thereof, it should be understood that numerous other modifications and variations can be made without departing from the spirit and scope of the present invention by those skilled in the art. It is obvious that the modifications and variations fall within the spirit and scope thereof.

The invention claimed is:

1. An apparatus for collecting harmful website information comprising:

a database unit, implemented in a hardware processing device, storing a harmful website Uniform Resource Locator (URL) of a harmful website and a non-harmful website URL;

a web page collection and extraction unit, implemented in the hardware processing device, collecting a harmful web page of the harmful website URL and extracting a starting point URL contained in the harmful web page;

a URL processing unit, implemented in the hardware processing device, normalizing the starting point URL to generate a representative URL, disregarding the representative URL if the representative URL is matched with the non-harmful website URL in the database unit, and storing the representative URL as a provisional harmful website URL in the database unit if the representative URL is not matched with either the harmful URL or the non-harmful URL in the database unit;

a harmful website connection analysis unit, implemented in the hardware processing device, performing a link circulation analysis with the provisional harmful website URL and determining whether the provisional harmful website URL is harmful according to the link circulation analysis, wherein the link circulation analysis determines if a URL contained in a second web page of the representative URL directly or indirectly references back to the harmful website and if the URL contained in the second web page directly or indirectly references back to the harmful website, confirming the provisional harmful website URL to be harmful; and a harmful site rank calculation unit, implemented in the hardware processing device, calculating, in response to determining the URL of the second web page does not reference back directly or indirectly to the harmful website, a harmful website ranking of the second web page by checking whether the second web page includes harmful words from the harmful website and calculating the harmful website ranking based on statistical analysis information regarding the harmful words included in the second web page.

2. The apparatus of claim 1, wherein the URL processing unit divides URL information contained in the harmful web page into a sub-page URL and remainder page URLs and extracts a respective representative URL from each of the remainder URLs, in which a sub-directory internet address of each of the respective remainder URLs is removed therefrom.

3. The apparatus of claim 1, wherein the database unit stores a list of URLs of confirmed harmful websites and provisional harmful websites.

4. The apparatus of claim 1, wherein the link circulation analysis generates a directed graph showing a link circulation from the provisional harmful website URL.

5. The apparatus of claim 1, wherein the database unit stores the statistical analysis information regarding the harmful words included in the harmful website.

6. A method of collecting harmful website information, the method comprising:

extracting a first URL contained in a harmful website web page;

performing a link circulation analysis which is configured to check a link circulation relation starting from a first web page of the first URL and determining whether the first web page is harmful according to the link circulation analysis;

if a pre-stored non-harmful website URL is found in the link circulation relation while performing the link circulation analysis, stopping the performance of the link circulation analysis, wherein the link circulation analysis determines the first web page to be harmful if the first web page contains a URL that directly or indirectly references back to the harmful website web page; and calculating, in response to determining the URL of the first web page does not reference back directly or indirectly to the harmful website web page, a harmful website ranking of the first web page by checking whether the first web page includes harmful words from the harmful website and calculating the harmful website ranking based on statistical analysis information regarding the harmful words included in the first web page.

7. The method of claim 6, wherein the determining of whether the first web page of the first URL is harmful, according to the link circulation analysis, further comprises calculating a directed graph.

* * * * *